(12) United States Patent
Stijns et al.

(10) Patent No.: US 9,386,852 B2
(45) Date of Patent: Jul. 12, 2016

(54) GUIDE, BEARING MEANS FOR A GUIDE AND METHOD AND PARTS FOR FORMING BEARING MEANS FOR A GUIDE

(71) Applicant: Thomas Regout International B.V., Maastricht (NL)

(72) Inventors: Andreas Petronella Maria Stijns, Maastricht (NL); Johannes Egbertus Gerardus Welten, Maastricht (NL)

(73) Assignee: Thomas Regout International B.V., Maastricht (NL)

( * ) Notice: Subject to any disclaimer, the term of this patent is extended or adjusted under 35 U.S.C. 154(b) by 0 days.

(21) Appl. No.: 14/386,528

(22) PCT Filed: Mar. 22, 2013

(86) PCT No.: PCT/NL2013/050213
§ 371 (c)(1),
(2) Date: Sep. 19, 2014

(87) PCT Pub. No.: WO2013/141709
PCT Pub. Date: Sep. 26, 2013

(65) Prior Publication Data
US 2015/0043842 A1    Feb. 12, 2015

(30) Foreign Application Priority Data

Mar. 22, 2012  (NL) ..................................... 2008518
Mar. 22, 2012  (NL) ..................................... 2008521

(51) Int. Cl.
*A47B 88/00*     (2006.01)
*A47B 88/14*     (2006.01)
(Continued)

(52) U.S. Cl.
CPC .................. *A47B 88/14* (2013.01); *A47B 88/10* (2013.01); *F16C 29/04* (2013.01); *F16C 33/38* (2013.01);*F16C 33/3812* (2013.01); *F16C 33/3837* (2013.01); *F16C 33/40* (2013.01); *F16C 43/04* (2013.01); *A47B 2210/0035* (2013.01); *A47B 2210/0097* (2013.01); *Y10T 29/49679* (2015.01)

(58) Field of Classification Search
CPC ............... A47B 2210/0032; A47B 2210/0035; A47B 2210/059; A47B 88/10; A47B 88/14; F16C 33/38; F16C 29/0602; F16C 43/04
USPC ............... 312/334.11, 334.9, 334.13, 334.17, 312/334.22, 334.38; 384/18, 20
See application file for complete search history.

(56) References Cited

U.S. PATENT DOCUMENTS 4,089,568 A * 5/1978 Fall ......................... A47B 88/14
                                                              384/18
5,851,059 A * 12/1998 Cirocco ................. A47B 88/10
                                                              312/330.1

(Continued)

FOREIGN PATENT DOCUMENTS

CN        2524581 Y     12/2002
CN        1939187 A      4/2007
(Continued)

*Primary Examiner* — Hanh V Tran
(74) *Attorney, Agent, or Firm* — Preti Flaherty Beliveau & Pachios LLP

(57) ABSTRACT

A modular ball bearing retaining cage and a slide guide employing such a cage are disclosed. The cage includes a bridge part having opposed end parts spaced by a mid-section and module strips that are connected to the end parts. Each module strip includes one or more guide strip modules. At least some of the guide strip modules include ball bearings disposed in openings provided in respective guide strip modules. The end parts and the guide strip modules have cooperative coupling elements that permit coupling therebetween. The module strips are disposed in guide tracks defined by walls of inner and outer profiles of the slide guide and the ball bearings run within the guide tracks to allow extension of the inner profile with respect to the outer profile. Stop modules may be coupled to the module strips via coupling elements to limit relative travel of the profiles.

31 Claims, 15 Drawing Sheets

(51) Int. Cl.
*A47B 88/10* (2006.01)
*F16C 33/38* (2006.01)
*F16C 29/04* (2006.01)
*F16C 43/04* (2006.01)
*F16C 33/40* (2006.01)

(56) References Cited

U.S. PATENT DOCUMENTS

| | | | | |
|---|---|---|---|---|
| 6,379,045 | B1* | 4/2002 | Cirocco | A47B 88/10 312/334.11 |
| 7,213,896 | B2* | 5/2007 | Chi | A47B 88/10 312/334.8 |
| 8,277,003 | B2* | 10/2012 | Milligan | A47B 88/10 312/334.33 |
| 2005/0218761 | A1 | 10/2005 | Chi | |
| 2007/0065055 | A1 | 3/2007 | Pan | |

FOREIGN PATENT DOCUMENTS

| | | |
|---|---|---|
| CN | 101210587 A | 7/2008 |
| DE | 1207158 | 12/1965 |

* cited by examiner

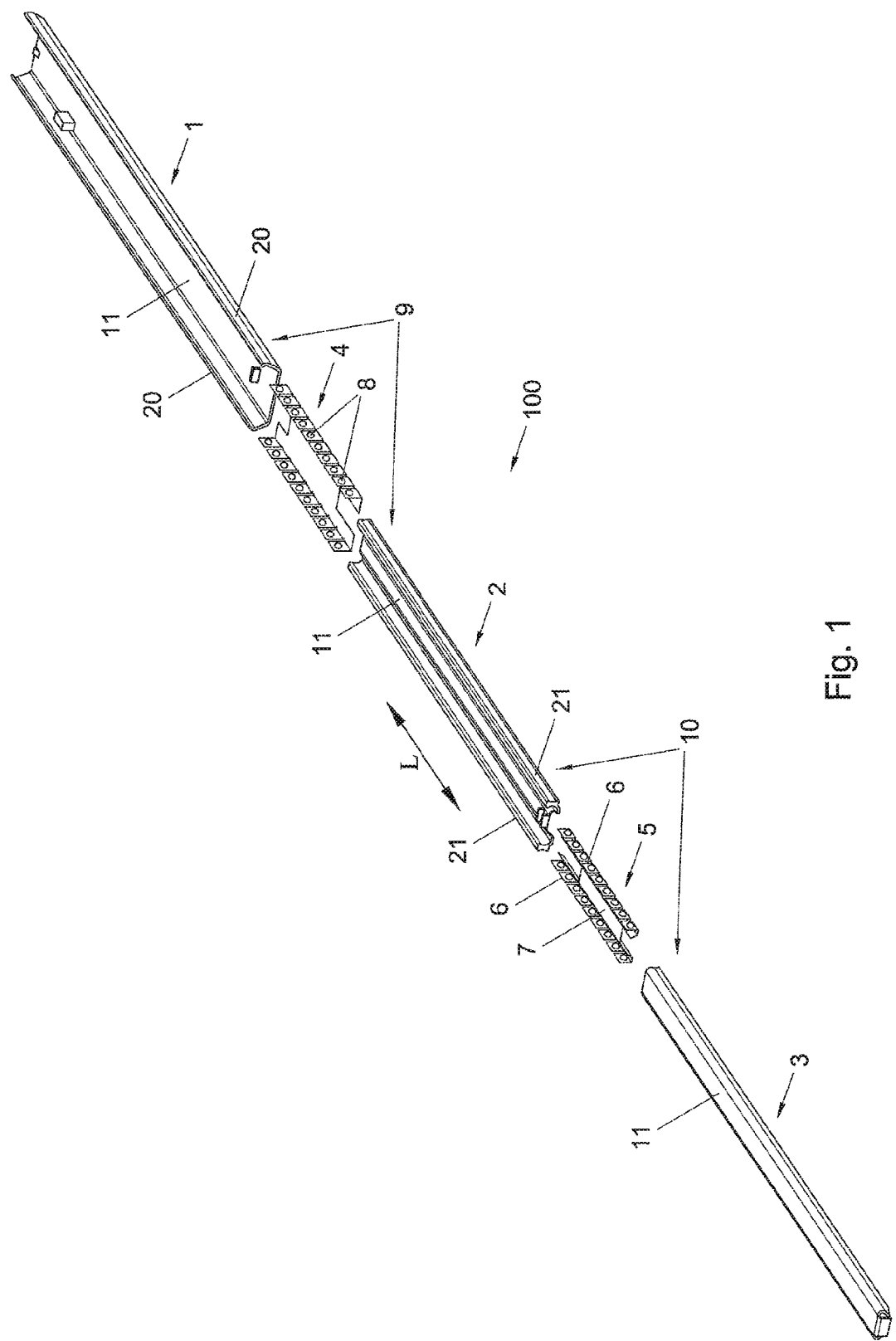

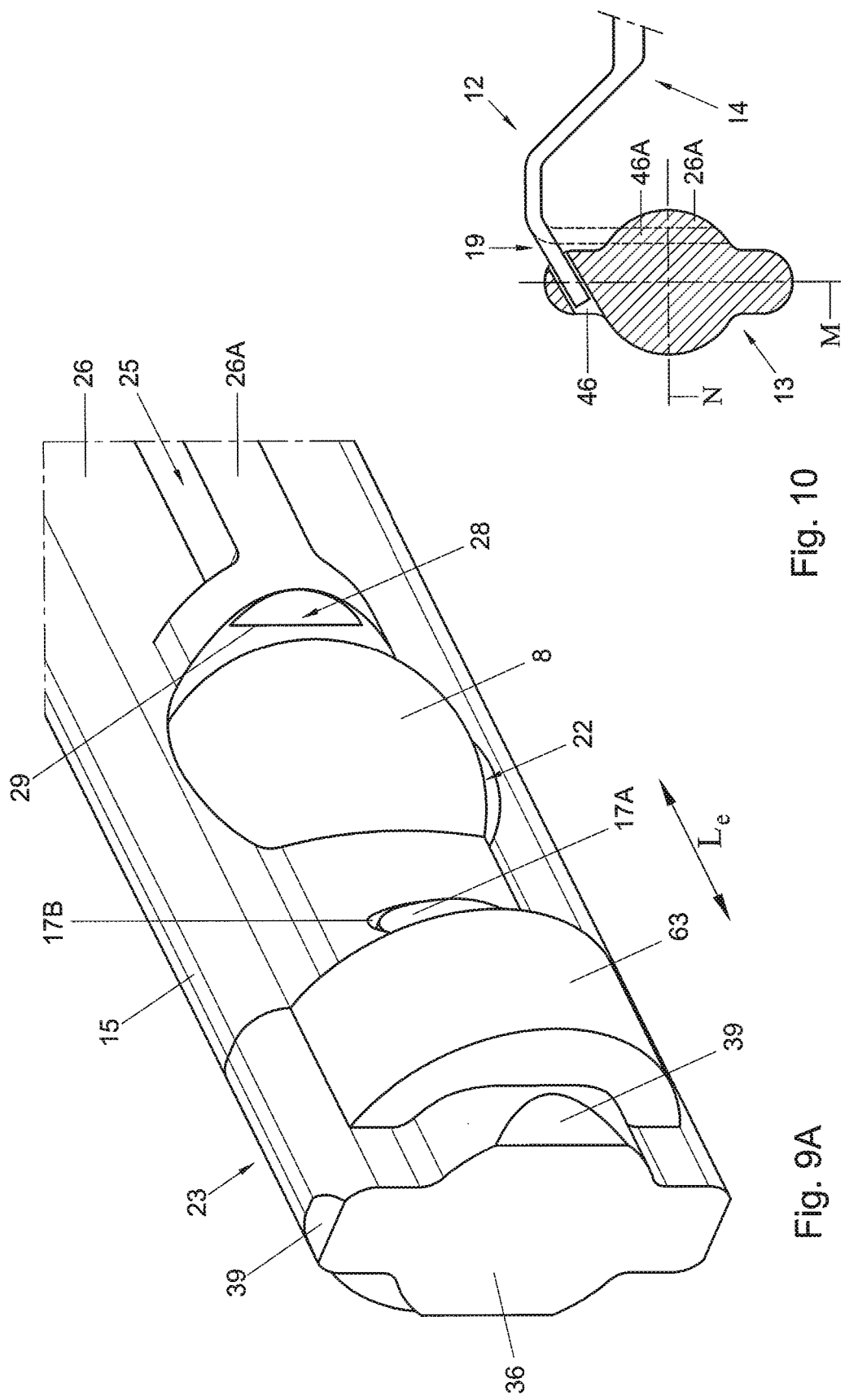

GUIDE, BEARING MEANS FOR A GUIDE AND METHOD AND PARTS FOR FORMING BEARING MEANS FOR A GUIDE

The invention relates to extension guides such as drawer guides, machines guides and the like. The invention further relates to a method for forming a bearing for a guide and to parts for forming the same.

Guides for drawers, machines or the like are commonly used for guiding a sliding movement of one or more parts relative to one or more other parts, such as a drawer relative to a cabinet or a machine part relative to a machine frame. Such guides commonly comprise at least a first and second guide profile, having parallel longitudinal directions, one fitted at least partly inside the other. Bearing means are provided between two parallel guide tracks formed between both profiles, such that the first profile can be carried by the second profile or vice versa through the bearing means.

In a first embodiment bearing means of such known guide can be formed by a ball bearing cage comprising two series of ball bearings, one of said series positioned in each of the guide tracks. The bearing cage is made of metal sheet material and has a mid section extending between two ball holding portions, such that the mid section extends between two parallel central parts of the profiles extending between the guide tracks. Since mounting means such as screws or bolts have to be mounted through said central parts for mounting the respective profiles to the relevant elements they have to carry, and since the cage has to pass said mounting means, these guides will have a relatively large thickness in the part formed by the central parts, perpendicular to the longitudinal direction. Furthermore in these embodiments the entire cage, including the ball holding portions, is made of the same thickness material. This means that for forming the ball holding portions a relatively complicated and cumbersome folding has to be applied in order to be able to retain the bearing balls and provide for sufficient support surface for each ball. In such embodiments the cage can be provided with stop elements on opposite longitudinal ends, which can cooperate with stopping means on one or both of the profiles, in order to limit longitudinal movements of the profiles relative to each other. These stops have the disadvantage that they require space between the mid-sections of the guide profiles. In many guides mounting has to be performed by screwing a screw bolt through a midsection of an outer profile, which can only be done through an opening through at least one other profile and an intermediate ball bearing cage. Since these guides are used for different purposes, different mounting means and positions are to be used, which means that a variety of bearing cages is necessary to accommodate these positions.

In a second embodiment bearing means for such known guides can be formed by ball bearing strips, one for each of said two guide tracks. These bearing strips each comprise a series of ball bearings. The strips can be made of metal, comprising a series of openings for the ball bearings. The thickness of the material used can be such that the walls of the openings provide for sufficient support surface and retaining the balls. In another embodiment the strips can be made of folded sheet material, such as in the previously described cage. In many embodiments the strips can be made from extruded profiles, in which then openings for the balls are created which has to be done in a separate, subsequent and costly procedure. Extrusion makes it difficult to provide for example damping elements. Since the material does not extend between central portions of the profiles, between the tracks there is no risk of the bearing means coming into contact with mounting means extending through a central section of one or both of said profiles. However, the bearing strips can move relative to each other in longitudinal direction, for example due to slip, uneven loading of the guide or contamination of one or both of the tracks. Especially increased pressure at a leading ball at extended positions of the guide and increasing deformation of a profile or the guide at such extension will lead to such relative movement. Moreover the strips can tilt within the tracks. This will lead to damage such as uneven wear to the bearing means, especially to the bearing balls and to the tracks, as well as the strips. Moreover, this relative longitudinal movement can lead to limitation of the effective length of extension and/or retraction of the guide available.

For these known guides bearings are especially designed and manufactured.

The present disclosure discloses alternatives to the bearings for guides and/or the existing guides as described here above. The present disclosure has as an aim to provide for a guide and/or bearings that are easy to manufacture and with relatively high manufacturing flexibility. The present disclosure has as a further aim to provide for a guide in which movement of parts of the bearing means relative to each other can be prevented. An aim of the present disclosure is to provide for a bearing and a guide which are relatively easy to manufacture and use.

At least one of the above mentioned and other aims can be achieved according to the present disclosure.

In an aspect the present invention can be embodied by a kit of parts for forming a bearing for a guide such as a sliding rail. The kit of parts can comprise at least a number of guide strip modules having a longitudinal direction, which guide strip modules comprise coupling elements for coupling modules to each other in said longitudinal direction. At least a number of said guide strip modules comprises bearing elements, such as balls, wheels or rolls forming bearing surfaces, preferably at two opposite sides of the modules. Some modules can be included without such bearing elements.

A kit of parts can further comprise at least one bridge part and/or end modules, all provided with appropriate, compatible and interconnectable coupling elements for coupling parts of the kit of parts to each other.

Such kit of parts provides for a modular system with which all kinds of bearings can be formed for guides, which bearings can for example have a general shape comparable to a known metal or plastic ball cage, or of a series of ball bearing strips. The modular system provides for the freedom to configure many different bearings, for example differing in the overall length of the bearing, the number of balls, the availability and/or position of a bridge part relative to longitudinal ends, the number of bridge parts, the longitudinal ends of the bearing and other such features. This means that a kit of parts will allow the manufacture of bearings for a large variety of guides.

In a kit of parts modules can be provided without bearing elements and/or without openings for holding such bearing elements. These "closed modules" can for example be designed to be coupled between two other modules, either bearing element carrying modules and/or closed modules, bridge parts and/or end modules. By providing such closed modules, which can have any length desired, the bearing elements can be positioned at appropriate positions along the strip, spaced apart over larger distances. Closed modules may be less expensive to manufacture. Closed modules can provide for proper placement of a limited number of bearing elements only in positions where they are necessary. In an aspect the kit of parts can be designed such that the modules, at least one bridge part and end modules comprise the same or compatible coupling elements for forming couplings between:

a module and a module;
a module and a bridge part;
a bridge part and a bridge part; and/or
a bridge part and an end module.

In an aspect a guide according to the disclosure can comprise at least a first and a second guide profile, each guide profile having a longitudinal direction, where the first guide profile extends at least partly within the second guide profile. The longitudinal direction of the guide profiles can be parallel to each other, wherein on two opposite sides, parallel to the longitudinal directions, guide tracks are formed between wall parts of the first and second guide profiles. A ball guide strip can be included in each of the guide tracks, each guide strip comprising a strip having a longitudinal direction and a series of openings spaced apart in said longitudinal direction of the strip, balls being provided in the openings which run on said wall parts forming the tracks. At least one bridge part can be provided between the two guide strips, connecting the guide strips such that they are substantially prevented from movement relative to each other. The guide strips can be assembled using modules from a kit of parts according to the disclosure. Any bridge part or end module used can also be from such kit of parts.

By providing the at least one bridge part between the strips in a simple and advantageous manner longitudinal movement of the strips relative to each other can be prevented, avoiding damage to the bearing means and/or guide track and preventing compromising a possible sliding movement of the profiles relative to each other.

Moreover, this enables easy mounting of the strips in the correct position.

The at least one bridge part or the bridge parts together preferably have a size, measured in the longitudinal direction of the guide, which is smaller that the longitudinal length of the strips. Preferably the or each bridge part is spaced apart from either end of the strips.

In embodiments the or each bridge part can be connected to the strips, preferably releasably connected. In embodiments the or each bridge part can be made as a part separate from the strips, and can be coupled thereto. In embodiments the bridge part can be made of a material different from the strips. In embodiments the strips can have a thickness perpendicular to the longitudinal direction which is larger than the thickness of the bridge part. The thickness of the bridge part in embodiments can extend substantially perpendicular to the central portions of the profiles.

In embodiments the bearing means can be formed from a kit of parts, comprising at least one bridge part and at least two strip portions and a number of bearing balls, designed such that the bridge part can be coupled to at least two of the strip portions, whereas at least a number of the bearing balls can be positioned in at least a number of the opening. In embodiments a number of strip portions can be coupled to each other for forming a strip, wherein preferably opposite sides of the bridge part can be coupled to or between two such strip portions.

In embodiments the strips or strip portions can be made of plastic, and can be made by injection moulding. In embodiments the bridge part or parts thereof can be made of plastic, and can be made by injection moulding. In embodiments the strips or strip modules can be provided with openings for the bearing balls, wherein the openings can be provided with retaining portions for retaining the bearing balls in the strips or modules.

Some or all of the features described here above can be combined in an embodiment.

In an aspect a method according to the disclosure can comprise the steps of forming a bearing or bearing means as a first and second guide strip with each a series of bearing balls, using guide strip modules, which are preferably of the kit of parts and which may or may not be interconnected by at least one bridge part.

The bearing means may then be placed between guide track forming portions of guide profiles, such that one of the guide profiles extends at least partly in the other profile, wherein a bridge part, if available in the bearing means, can extend between central portions of the profiles. Preferably the bridge part is coupled to the guide strips. The guide strip modules and/or the bridge part can be made by moulding, especially injection moulding from plastic.

In an aspect a method according to the disclosure can comprise forming the guide strips from strip portions or strip modules, by coupling the strip portions or strip modules to each other and/or to the bridge part.

For a better understanding of the present disclosure embodiments of a guide and parts thereof, especially bearing means, and a method for forming the same will be described hereafter, with reference to the drawings.

FIG. 1 shows schematically in perspective view a guide according to the prior art, having a first, second and third guide profile and intermediate first and second ball bearing cages;

FIG. 2A-C show schematically, in top view, frontal view and side view respectively an embodiment of a bearing means comprising two guide strips and a bridge part connecting the strips, the strips comprising modules;

FIG. 3 in perspective view a bearing means of FIGS. 2 and 2A;

FIG. 4A-C shows a strip module in side view, top view and end view respectively;

FIG. 4D shows a strip module in cross section along the line D-D in FIG. 4C;

FIG. 4E in perspective view a strip module without ball openings;

FIG. 5A-C shows a bridge part in side view, top view and end view respectively;

FIG. 6A-C an embodiment of a stop module in side view, top view and end view respectively;

Figure 9:
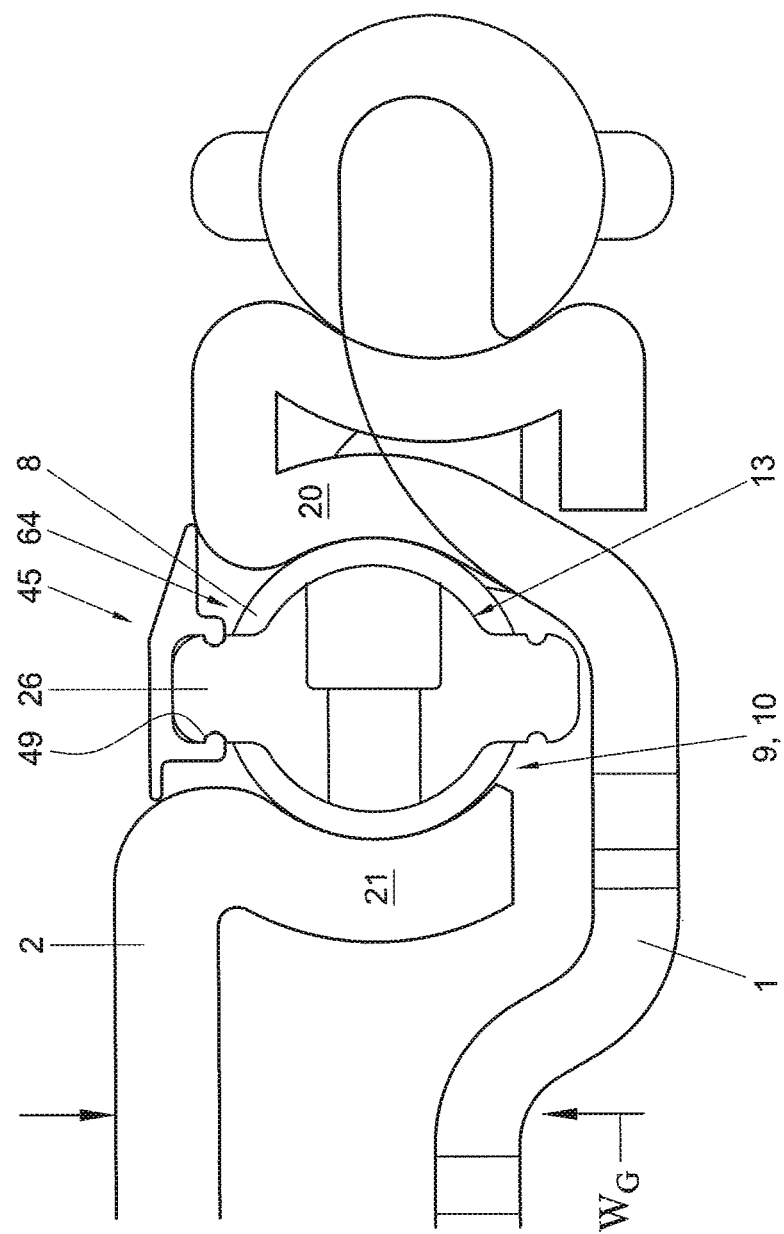

FIG. 9 in end view part of a guide comprising bearing means and a closure;

FIG. 9A an end part of a bearing comprising a ring; and

FIG. 10 shown schematically in cross section part of a strip or strip module and a bridge portion connected thereto.

In this description schematically embodiments are shown of a kit of parts for forming a bearing means, a guide, parts thereof and methods for forming the same, as well as of bearings as such, by way of example only. These embodiments should by no means be understood as limiting the scope of the disclosure in any way. In the embodiments shown or described the same or similar parts have the same or similar reference signs.

In this description embodiments are shown of guides and parts thereof comprising at least two guide profiles, movable relative to each other in a longitudinal sliding direction, which can slide relative to each other in one direction or two opposite directions. In embodiments of the present invention there can be more than two such guide profiles, for example three profiles, such that one of the profiles can be at least partly enclosed between two further profiles, as shown in FIG. 1, which can for example form an over-extendable guide. Such embodiments are considered also to have been disclosed herein, with bearing means according to the present invention between at least two of the guide profiles.

In this description a bearing means or bearing 12 can be referred to as guide element, or a set of guide elements such as separate guide strips 13, either coupled or uncoupled. In this description the wording bearing and bearing means are interchangeable, unless specifically differentiated.

In this description substantially shall be understood as meaning that slight variations of given dimensions, sizes, shapes and positions or the like are within the scope, such as variations and deviations of at least 20%, more specifically at least 10% and even more specifically at least 5%.

In the embodiments disclosed guide strips and/or bridge parts and/or parts thereof can be made partly or entirely of plastic, for example by injection moulding, extrusion injection moulding, injection compression moulding, by machining or combinations thereof. In embodiments guide strips and/or bridge parts and/or parts thereof can be made partly or entirely of metal.

Profiles for guides according to the present disclosure can be made partly or entirely of metal or plastic. In embodiments the profiles can be made by forging, extrusion, machining, rolling or other techniques known to the person skilled in the art, including combinations of such techniques.

FIG. 1 shows in exploded view a guide 100 known from the prior art. This guide 100 comprises a first guide profile 1, a second guide profile 2 and a third guide profile 3. A first ball bearing cage 4 and a second ball bearing cage 5 are provided, each made of sheet metal and folded or rolled into a substantially U-shaped cross section, comprising two parallel ball bearing holding portions 6 carrying balls 8 and connected by a mid section 7. The guide profiles 1, 2, 3 each have a longitudinal direction L between opposite ends, and can be nested, such that the second profile 2 is enclosed between the first and third profiles 1, 3. Between the first and second profile 1, 2 and between the second and third profile 2, 3 tracks 9, 10 are formed, such that when the first cage 4 is enclosed between the first and second profile 1, 2, the balls 8 of said cage are run in the relevant tracks 9, whereas of the second cage 5 enclosed between the second and third profile 2, 3, the balls 8 run in the other tracks 10. Thus the profiles 1, 2, 3 are slidable relative to each other in said longitudinal direction L, in a known manner, between a fully retracted position and an extended position. Each cage 4, 5 has a mid section 7 extending between two central parts 11 of the profiles 1, 2 and 2, 3 extending between the guide tracks 9 and 10 respectively. As can be seen in these cages 4, 5 the thickness of the sheet material is the same overall, both in the ball bearing holding portions 6 and the mid section 7. Obviously one of the cages 4, 5 and one of the guide profiles 1, 2, 3 can be omitted, or further such cages and profiles could be added.

In guides according to the present disclosure in stead of the cage, one of the cages or all of the cages a bearing means 12 according to this disclosure can be used. In such bearing means 12 two ball strips 13 are used, which may or may not be interconnected by at least one bridge part 14. The bridge part 14 prevents the strips 13 from movement relative to each other, at least in longitudinal direction of the guide and preferably also against tilting movement.

In the present invention bearing means 12 are disclosed of modular design comprising at least strip modules, which can be combined with one or more bridge portions and/or end modules. The modules and/or bridge portions are preferably interchangeable in position, such that virtually any configuration of bearing means can be provided with a limited number of different parts. By using bridge portions having different widths, with the same modules bearing can be provided for different widths of guides, the width being the size perpendicular to the direction of extension and retraction of the guide, between opposite tracks. Modules and/or bridge portions can be provided having different ball sizes. Bridge portions can be provided in any longitudinal position. Modules can be used having different lengths, for example two or three lengths, making them relatively inexpensive and providing for flexibility in assembling different lengths of bearings, with different bridge positions.

Modules can be used having no bearing elements and/or no openings for such bearing elements, which can be referred to as closed modules, which can be provided with compatible coupling means. These modules can be positionable between and coupleable to two of the other modules, such as bearing element bearing modules, a bearing element bearing module and a bridge element or a bearing element bearing module and an end module or any one of these modules and another closed module. The closed modules can be used in positions where no bearing elements are necessary or even not desirable. Closed elements can be cheaper, can be more rigid, can be provided with additional supporting elements or other artifacts.

In general terms a guide 100 can comprise at least a first 1 and a second guide profile 2, each guide profile 1, 2 having a longitudinal direction L, where the first guide profile 1 extends at least partly within the second guide profile 2. The longitudinal directions of the guide profiles are parallel to each other. On two opposite sides of the guide 100, parallel to the longitudinal directions L guide tracks 9 are formed between wall parts 20, 21 of the first 1 and second guide profiles 2.

According to the invention a ball guide strip 13 is included in each of the guide tracks 9. Each guide strip 13 comprises a strip having a longitudinal direction Ls and a series of openings 22 spaced apart in said longitudinal direction Ls of the strip 13, balls 8 being provided in the openings 22 which run on said wall parts 20, 21 forming the tracks 9. At least one bridge part 14 may be provided between the two guide strips 13, connecting the guide strips 13 such that they are prevented from movement relative to each other.

Figure 2A:
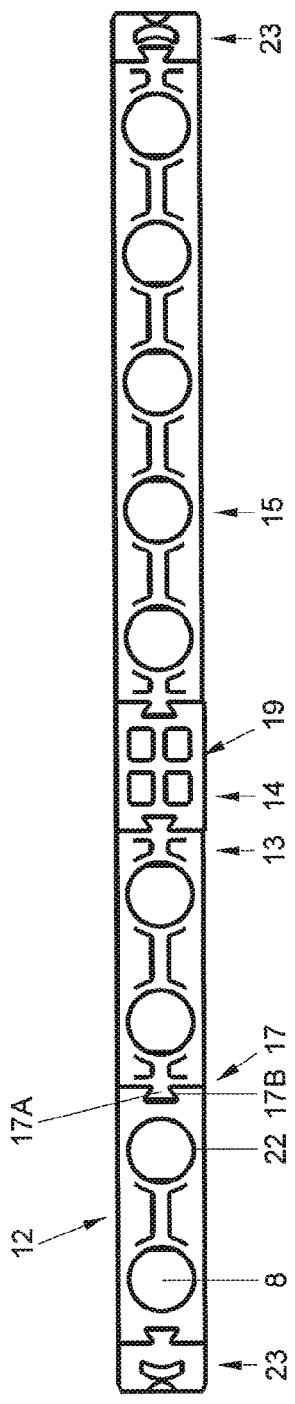
Figure 2B:
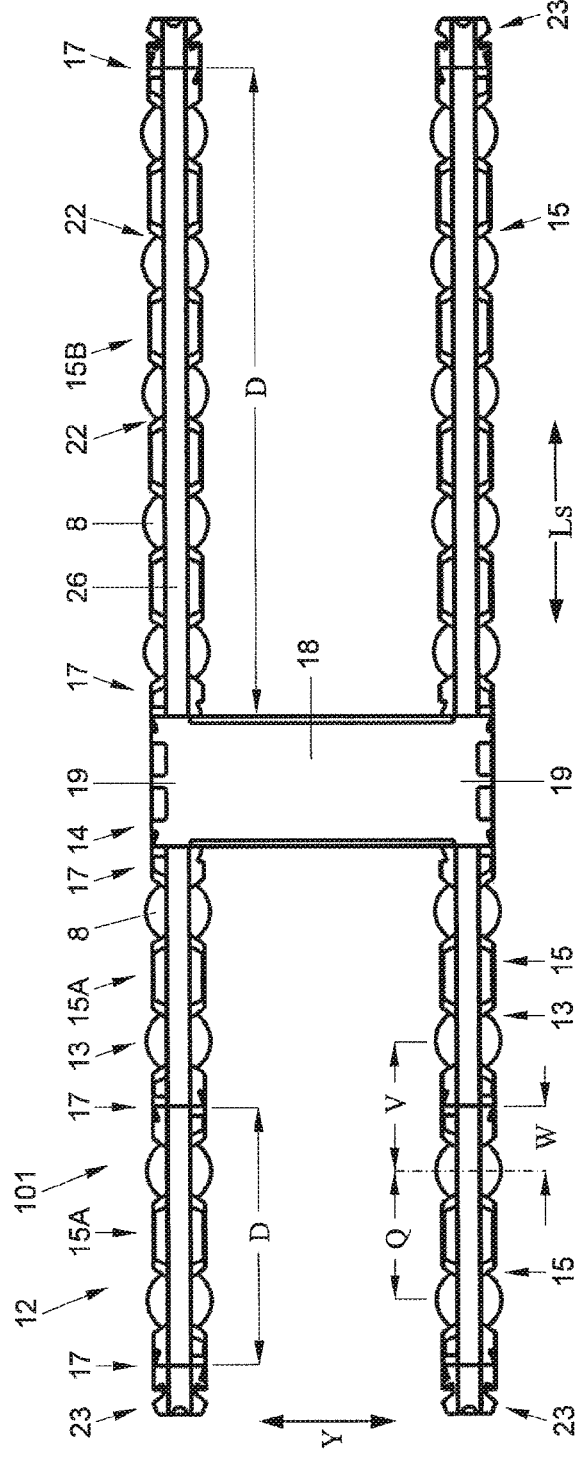
Figure 2C:
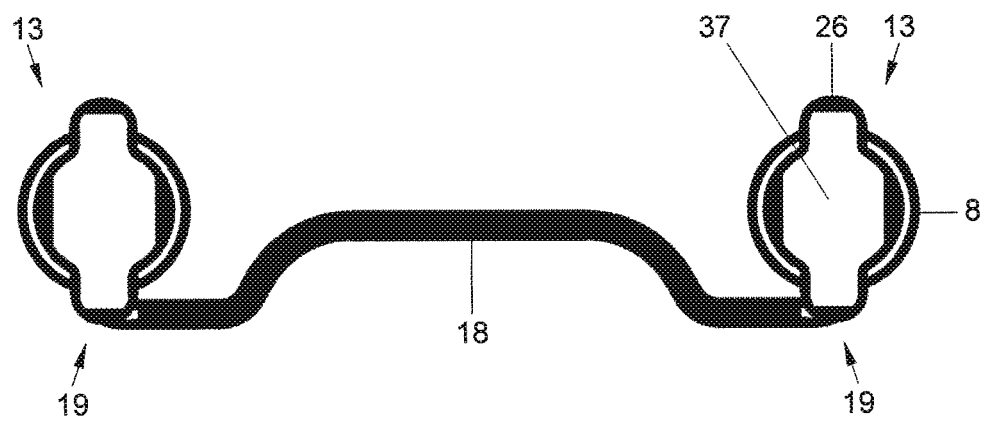
Figure 3:
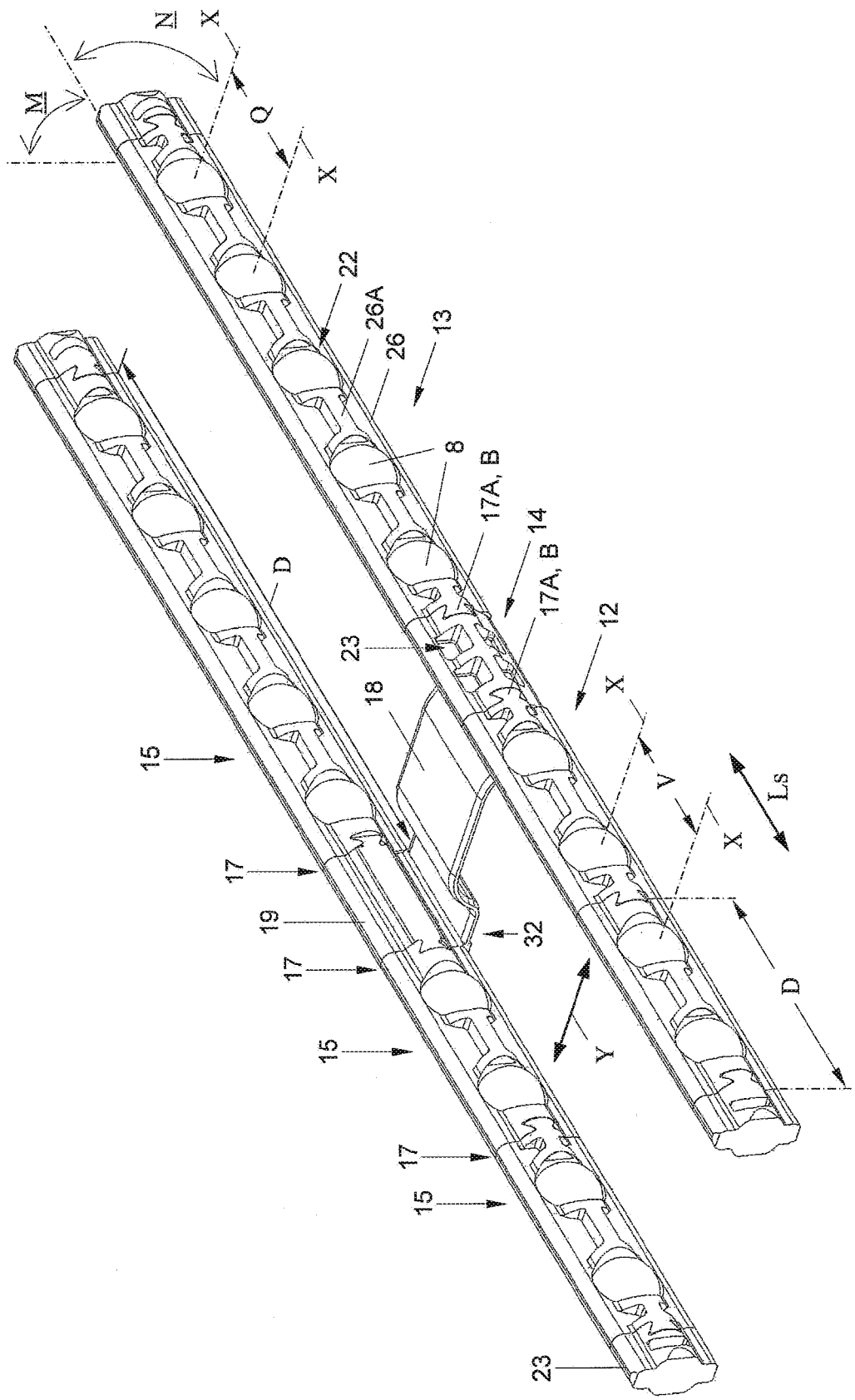

In FIGS. 2 and 3 an embodiment of such bearing means 12 is shown, in different views. In this embodiment the strips 13 are formed from a number of strip modules 15, and one bridge part 14. The strips 13 extend parallel to each other in a longitudinal direction, the bridge part 14 having a main direction y substantially perpendicular thereto. The strip modules 15 in each strip 13 are connected to each other, end to end, by appropriate coupling means 17. The bridge part 14 comprises a mid section 18 and two end parts 19 at opposite ends thereof. The end parts 19 are provided with coupling means 17 compatible with the coupling means 17 of the strip modules 15, such that such strip modules 15 can be coupled to the bridge part 14 through the coupling means 17 provided at the end parts 19. Effectively the end parts 19 of the bridge part 14 can form an integral part of the strips 13.

Each strip 13 can be provided at one or, preferably, both longitudinally opposite ends with an end module 23 forming a stop or buffer element. The end modules 23 can be provided with coupling means 17 which can be coupled to the compatible coupling means 17 of a strip module 15 or an end part 19 of a bridge part 14.

In the embodiment shown in FIG. 2 each strip 13 comprises three strip modules 15, two end modules 23 and an end part 19 of a bridge part 14. In the embodiment shown two strip modules 15A are positioned on one side of the end part 19, and one strip module 15B to the opposite side of the end part 19. The strip modules 15A have two openings 22 each, comprising a ball 8, whereas the strip module 15B has five such openings 22 with a ball 8 each. It will be directly apparent that strip modules 15 could be provided having any number of openings 22, whereas they can be distributed in a strip 13 in any position and configuration, relative to each other and/or to one or more bridge parts 14, depending for example but not exclusively on available longitudinal length in the relevant track 9, 10, the desired path of travel in said track 9, 10 and/or the load to be carried. Any such choice will be directly apparent to the person skilled in the art. In an embodiment a kit of parts 101 for forming a bearing means 12 of the present disclosure can comprise a number of strip modules 15, one or more bridge parts 14 and/or end modules 23, wherein the number of strip modules 15 can comprise at least two different strip modules 15A, 15B, differing in the number of openings 22 holding or for holding balls 8, for example two and five openings respectively, as shown, such that different combinations of such modules 15A, B can lead to substantially any number of balls 8 in a strip 13. Obviously a kit 101 could also comprise only one type of strip module 15 or more than two types. The modules 15, 14, 23 can differ in for example the number of balls, position of the balls, length, type of bearing means or other aspects.

Figure 4A:
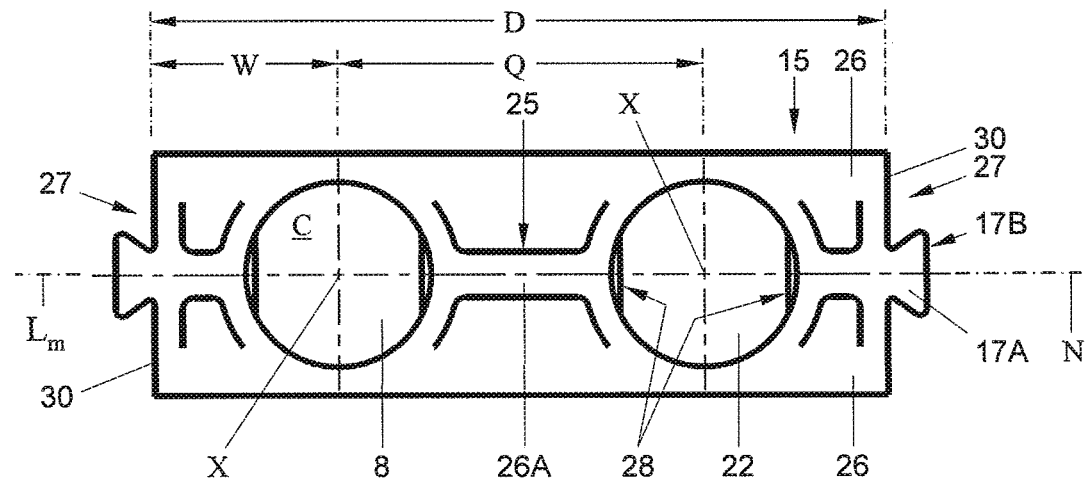
Figure 4B:
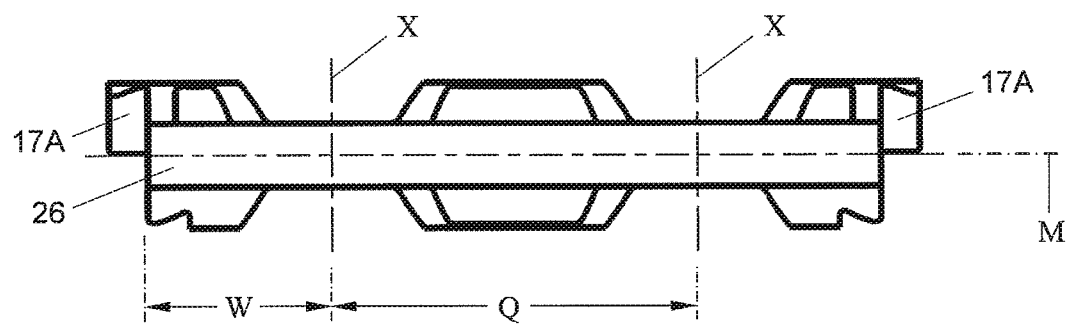
Figure 4C:
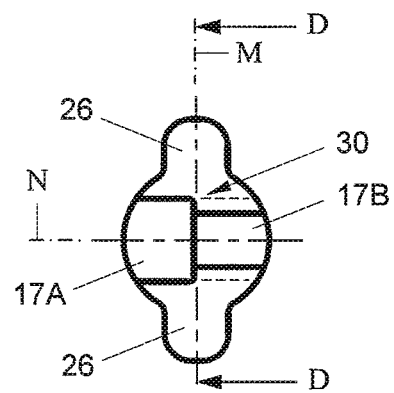
Figure 4D:
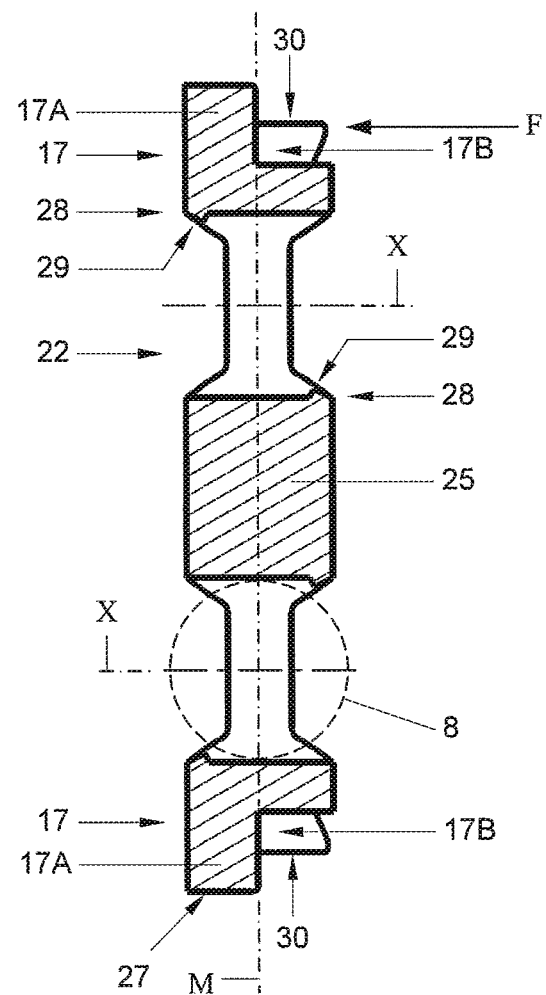
Figure 4E:
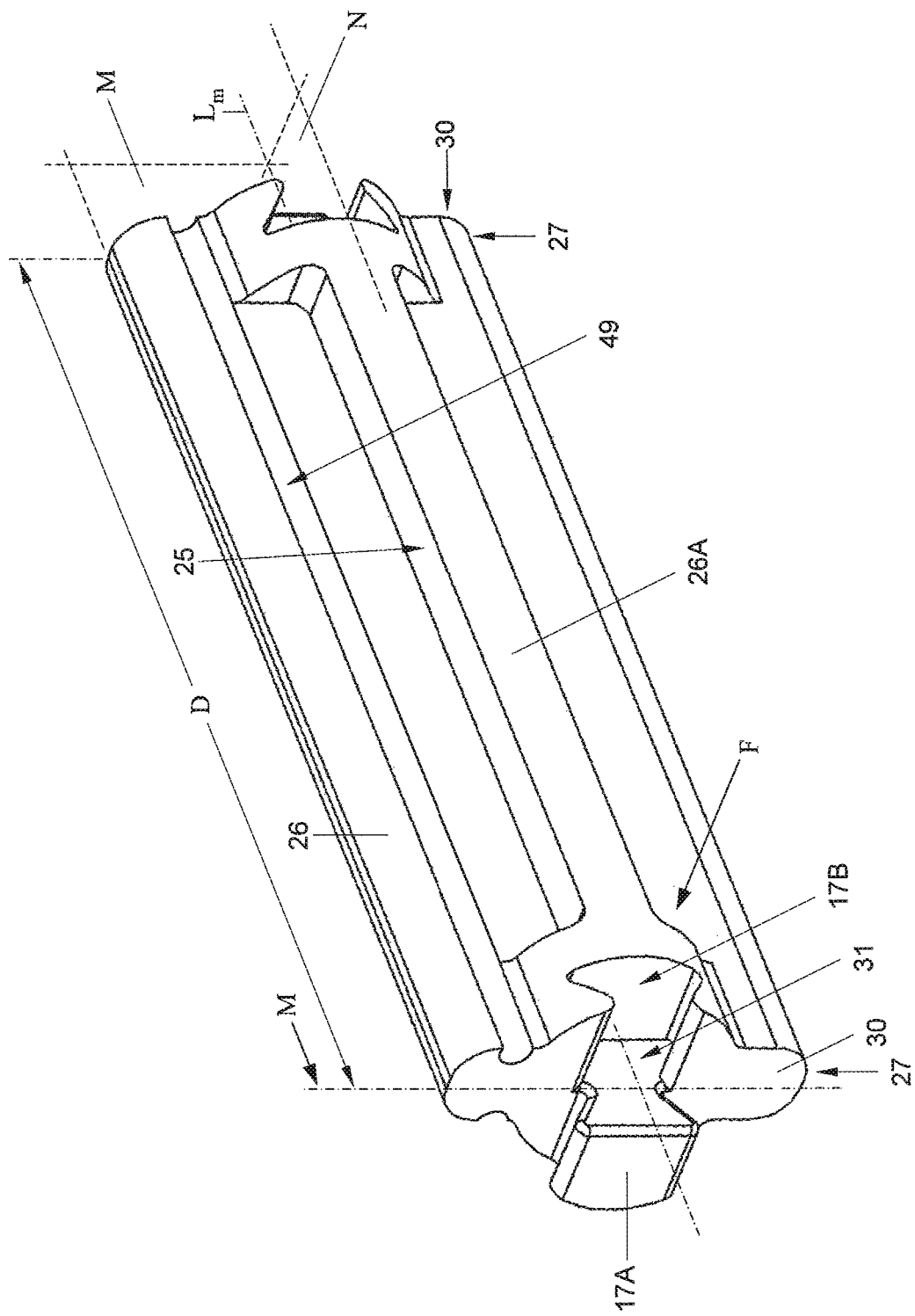
Figure 5A:
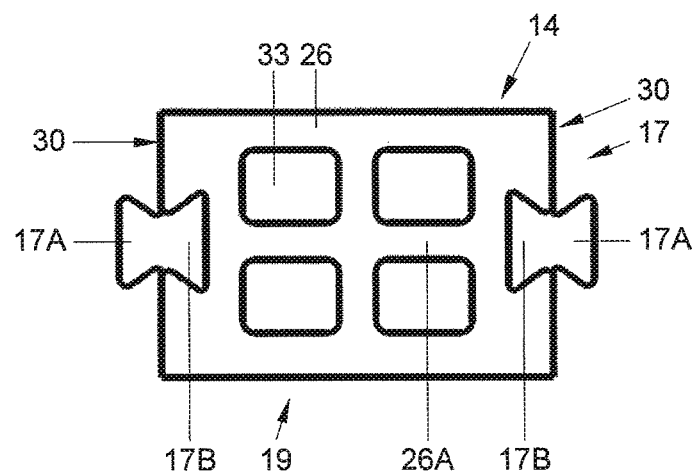
Figure 5B:
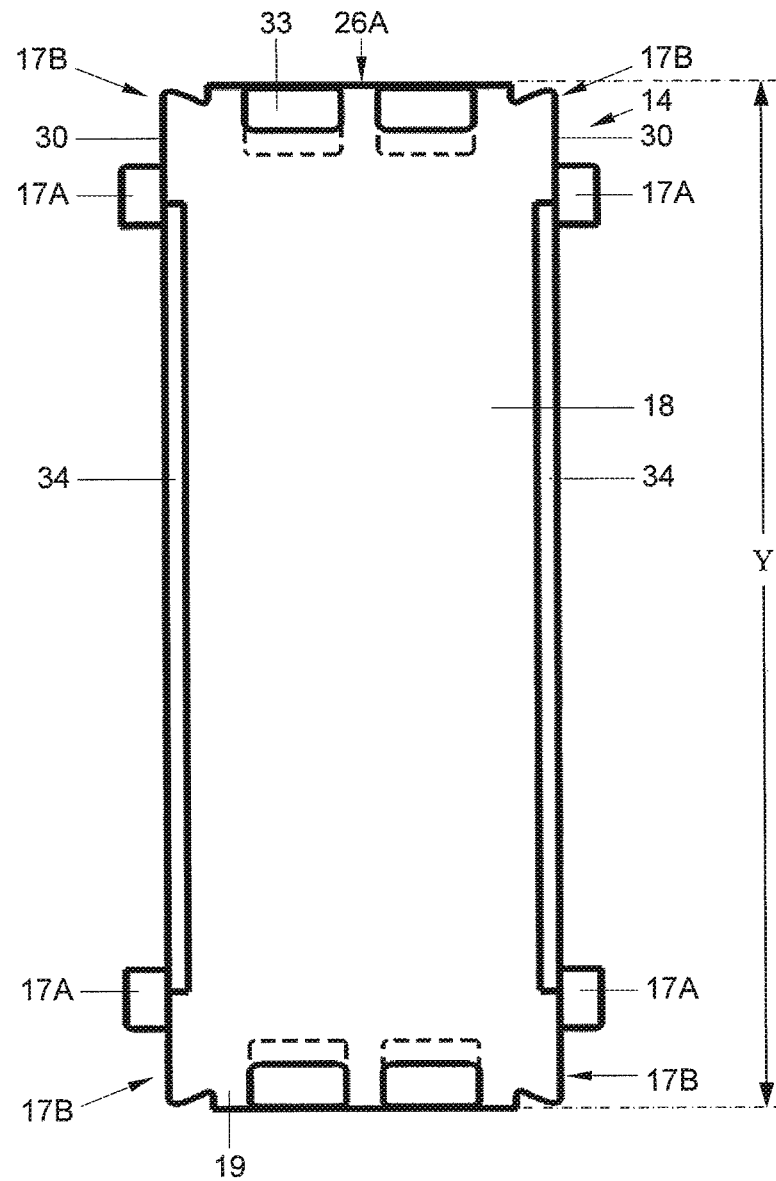
Figure 5C:
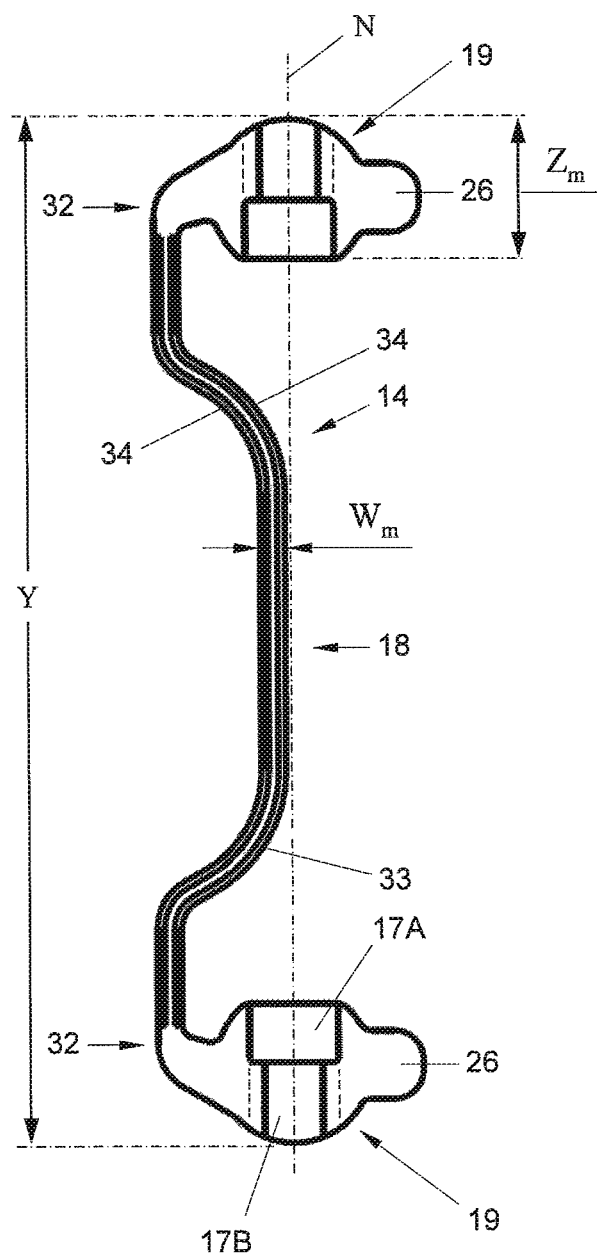
Figure 6A:
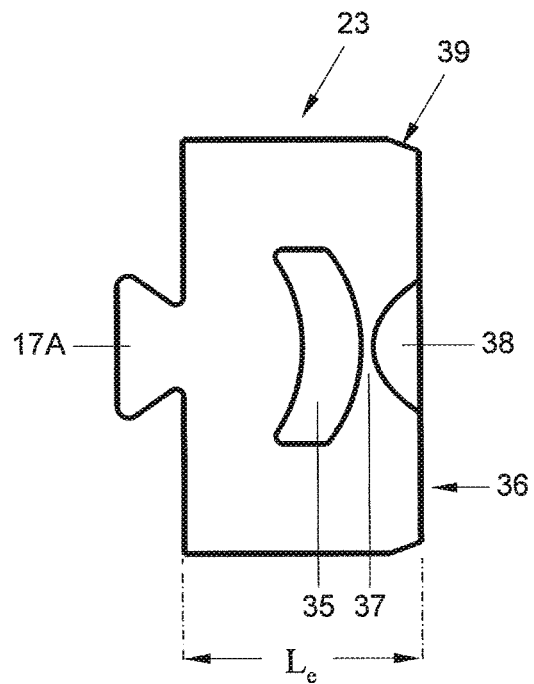
Figure 6C:
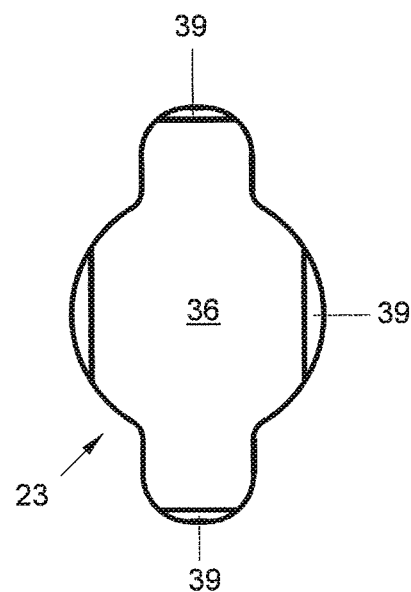
Figure 6B:
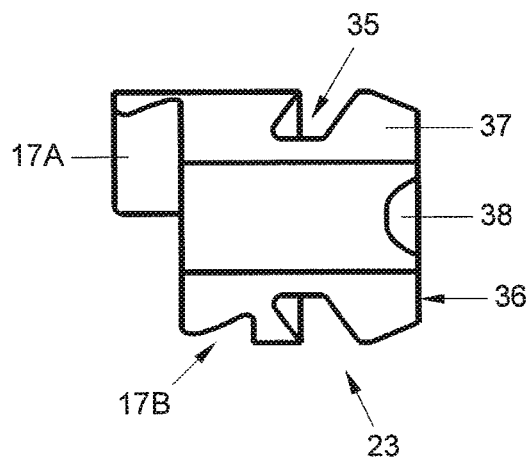

Embodiments of strip modules 15, a bridge part 14 and end modules 23 shall be discussed in further detail and by way of example only, with reference to FIGS. 4, 5 and 6.

FIG. 4 shows a strip module 15, which is preferably made of plastic or metal, for example by machining or injection moulding. FIG. 4E shows schematically a perspective view of a base shape of such module 15, without openings 22. The module 15 has a longitudinal axis Lm, which in use will be parallel to the longitudinal direction L of the guide and Ls of the strip 13 in which the module 15 will be integrated. In FIG. 4 in the module 15 a first plane M and a second plane N are shown, perpendicular to each other and both comprising the longitudinal axis Lm. The module 15 comprises a mid portion 25 extending in the longitudinal direction Lm, which can have at least in part, such as at opposite ends, a substantially circular cross section, and is provided with two ridges 26 extending along said mid portion 25 in longitudinal direction of the module at two opposite sides in the plane M, spaced apart from the plane N. In the embodiment of FIG. 4 two openings 22 are provided, extending through the mid portion 25. Each opening has a substantially circular cross section C having a central axis X, preferably substantially perpendicular to the plane M, and preferably in the plane N.

The cross section C is such that a ball 8 can be enclosed in said opening, in contact with or at close proximity of an inner part of the wall of the opening 22, the ball extending at two opposite sides of the module 15, preferably in the plane N, as schematically shown in FIG. 4D. In the embodiment shown between the longitudinal ends 27 of the module 15 the body, especially the mid section 25 of the module 15 can have slightly flattened sides, as shown in FIG. 4, formed with ridges 26A extending between the openings 22 and between each respective opening 22 and an adjacent longitudinal end 27 of the module, in the plane N.

The balls 8 can be placed freely in the openings 22, such that they are not positively retained and may fall out when the module 15 is lifted. In such embodiment the balls 8 will be retained in the openings 22 when the bearing means 12 is placed appropriately in a guide, the balls 8 extending between walls 20, 21 forming a track 9. Preferably however each opening 22 is provided with retaining means 28 for retaining the ball 8 in the opening 22. In embodiments the retaining means can be formed by for example ridges of notches in said opening 22, allowing the ball 8 to be pressed into the opening 22 by elastic deformation of part of the module 15, especially of the said retaining means, such that after the ball 8 has passed into the opening the retaining means will at least regain its original form and thus enclose the ball within the opening 22. The retaining means obviously will have to allow the ball to rotate within the opening 22. In the embodiment shown the retaining means 28 comprise two ridge shaped notches 29 in each opening, at diagonally opposed sides of the opening 22. As is shown in FIG. 4D lower opening 22 the ball cannot leave the opening 22 without deforming at least one of the notches 29.

Preferably the retaining means 29 are formed such that they can easily be injection moulded with the module 15. In the embodiment shown this is achieved by the diagonal positioning of the notches, such that mould parts can be used forming the opening 22 and the retaining means, which can open and close in the direction of the axis X. Obviously other embodiments could be possible too for achieving the same or a similar result. The retaining means are only shown by way of example in FIG. 4.

At opposite longitudinal ends 27 of the module coupling means 17 are provided. In the embodiment shown they are designed as so called dove tail couplings, comprising male and female dove tail coupling elements 17A, 17B that can engage, preferably in a direction F enclosing an angle with the longitudinal axis Lm, for example substantially perpendicular thereto, such that when a module is coupled in a strip 13 it cannot be pulled apart in the longitudinal direction Ls of the strip 13. In the embodiment shown each coupling means 17 comprises both a male dove tail element 17A and a female dove tail element 17B, at opposite sides of the plane M. The male element 17A extends outward from a longitudinal end face 30 of the module 15, in a direction away from the opposite longitudinal end face 30, whereas the female element 17B extends inward from the end face 30, in the direction of the opposite longitudinal end face 30. The elements 17A, B are formed and positioned such that two modules 15 can be coupled by the coupling means 17 by sliding the elements 17A, B of the respective modules into each other in a direction F, for example perpendicular to the plane M. Thus a positive coupling is achieved. The elements 17A, B are preferably such that the sliding movement of the male elements 17A is stopped by a wall part 31 of the female elements 17B extending substantially in the plane M, leading to a proper alignment of the modules 15. In a similar way the modules 15 can be coupled to similar coupling means 17 of end modules 23 and/or bridge parts 14, and/or end modules 23 to bridge parts 14.

In the embodiments shown a module 15 has a length D between the longitudinal end faces 30, whereas the distance between the axis X of two adjacent openings 22 is indicated by Q. The distance between an end face 30 and the axis X of an opening 22 closest to said end face is indicated by W. In the embodiment shown the distance W is substantially equal to half the distance Q between two adjacent openings 22. This means that when two such modules are coupled by the coupling means 17 the distance V between two openings 22 in the coupled modules 15 adjacent opposite sides of the engaging end faces 30 will be substantially the same as the distance Q between adjacent openings 22 in each of the modules 15, leading to a substantially even longitudinal distribution of balls 8 along the strip 13, at least in the parts thereof formed by the modules 15. In such embodiments the length D of a module will be approximately the number of openings plus one times the distance Q. In ball bearing strips 13 according to this description all modules 15 can comprise balls 8. However, in embodiments some modules 15 could be free of openings 22 and/or balls 8, in order to for example provide for relatively long strips having balls 8 at appropriately spaced apart locations only. Ball positions can therewith be chosen selectively depending on need or desire, whereas such strips 13 can be made relatively inexpensive.

FIG. 5 shows, by way of example, a bridge portion 14 for a bearing means 12, showing the mid section 18 and two end parts 19 at opposite ends thereof. The end parts 19 can have substantially the same cross section as the modules 15 and have two opposite longitudinal ends faces 30, each provided with coupling means 17. The coupling means 17 are similar to or identical to the coupling means 17 of the modules 15 and are not further discussed here. Reference is made to the discussion of FIG. 4 for further elucidation of the embodiment shown. Again a module 15, end module 23 and/or other bridge part 14 can be coupled thereto by sliding the male and female coupling elements 17A, B of adjoining parts into each other.

The mid section 18 of a bridge part 14 can be shaped in accordance with the central parts of the guide profiles between which it has to be used. In the embodiment shown the mid section is coupled at opposite ends 32 to a ridge portion 26 of a respective end part 19, whereas a middle portion 33 between said end parts is bent such that it extends substantially in or close to the plane N for example close to or at the axis of rotation of the bearing balls 8. The bridge portion 18 can be close to either one of the adjacent midsections 11, or even in contact therewith, especially when at least the bridge portion is made of plastic. This can for example provide for extra space for parts of the mounting means, such as but not limited to heads of bolts. Obviously other shapes and profiles can be provided. The bridge part 14 can be made from for example plastic or metal and can for example be injection moulded. The bridge part 14 can have for example rounded or chamfered leading and trailing edges 34, in order to further facilitate smooth sliding of the profiles relative to each other and preventing collision of the bridge part 14 with further parts of the guide 100.

As discussed before the modules 15 and end parts 19 can have a width Zm at or near the plane N which is different from, especially larger than the thickness Wm of the mid section 18 of the bridge part 14. The thickness Zm can for example be at least twice the thickness Wm, for example more than three times, such as but not limited to five times or more. This means that the walls of openings 22 can provide for sufficient support and retaining of the balls 8, whereas the overall thickness $W_G$ of the guide 100 at the position of the mid section 11 and especially the distances between profiles 1, 2, 3 can be chosen relatively freely and can be kept relatively small and/or such that sufficient space can be provided for mounting means or parts thereof extending between such profiles 1, 2, 3, for example a bolt 60 extending through a slot 61 in a mid section 11, the bolt 60 being indicated by broken lines in FIGS. 7 and 8.

In the embodiment shown in FIG. 5 each end part 19 comprises a number of indentations 33 in an outer face of the end part 19, in order to reduce material thickness and weight and especially prevent undesirable differences in thickness in the bridge portion, to avoid differences in shrinkage as much as possible, especially when made of plastic. In other embodiments there may be one or more openings 22 for holding a bearing ball 8 in each end part 19, similar to or identical to the openings in the modules 15, whereas the end part can be dimensioned such that the distance V between an axis of such opening 22 and adjacent openings 22 in modules 15 coupled to said end part 19 is again substantially the same as the distance Q between openings 22 in the modules 15.

FIG. 6 shows an embodiment of an end module 23. In this embodiment the end module 23 is designed as a stop or buffer block, which can run into a stop element 40 fixed in or formed in the track 9, 10 in which the relevant strip 13 runs as disclosed in FIGS. 7 and 8. The end module 23 can be provided with coupling means 17 similar to or identical to the coupling means of the modules 15 and/or bridge parts 14. In the embodiment shown the coupling means 17 again comprise a male and female dove tail element 17A, 17B, especially as discussed here above. The end module 23 can be made of a material softer than the material of the strip modules 15 and the bridge part 14, for example an elastomeric material such as but not limited to a TPE, or rubber. In embodiments the end module can be made of foam material or can be made of different materials, for example by 2K moulding, in order to provide a rigid coupling means 17 and a flexible end face 36. In embodiments the end module 23 can be provide with a chamber or opening 35 extending through the end module 23 in a direction enclosing an angle with the longitudinal direction Le, between an end face 36 and the coupling means 17, such that a frontal part 37 between the end face 36 and the chamber or opening 35 can flex under pressure exerted on the end face 36. A groove 38 or similar indentation can be provided in the end face 36, increasing the flexibility of frontal part 37.

Figure 7:
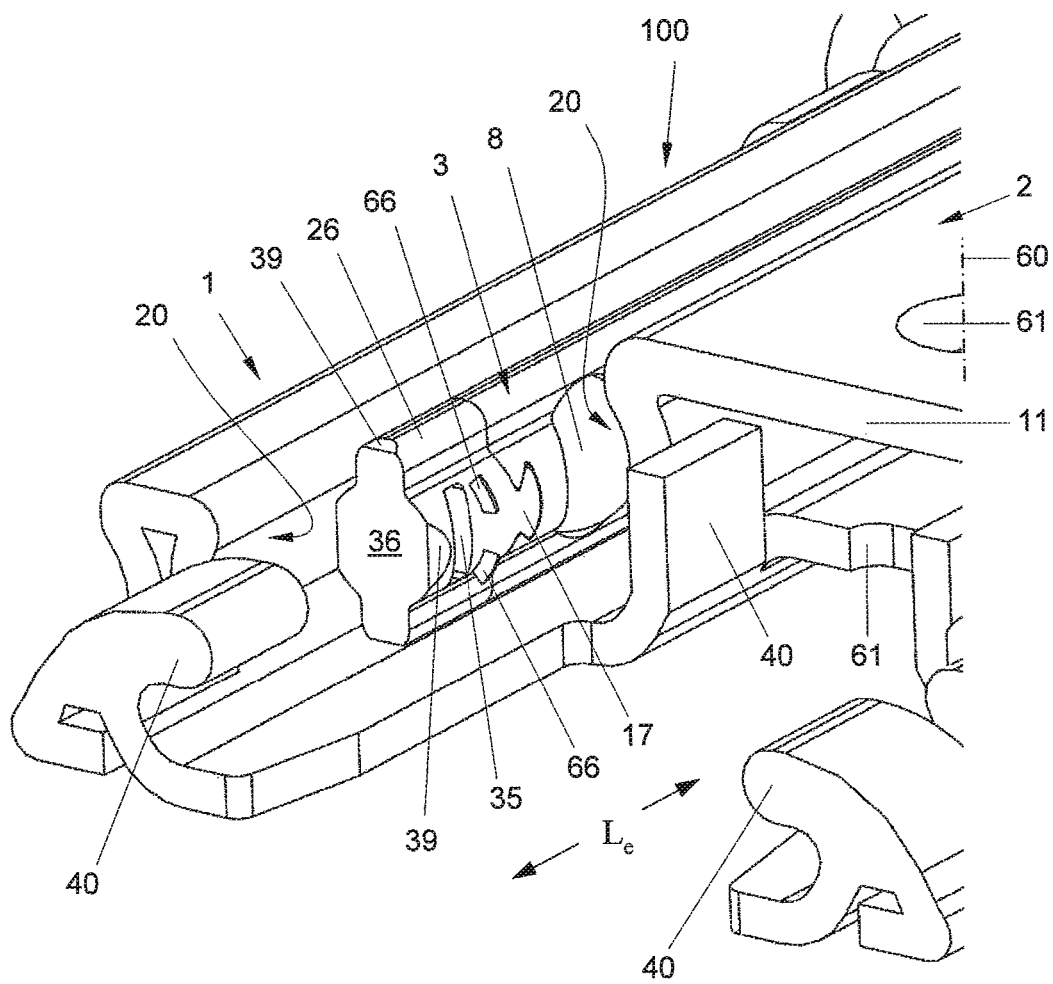
FIGS. 7 and 7A show schematically and partly broken away a guide comprising a bearing mean, with alternative stop means.

As is shown in for example FIGS. 6C, 7 and 9A especially, the end face 36 can have chamfered or rounded edge portions 39 which may be in close proximity of the track 9, 10 forming portions of the wall parts 20, 21 of the guide profiles 1, 2, 3. To this end the end surface 36 may have a shape similar to that of the end surfaces 30 of the strip modules 13, but slightly larger. During use when the profiles 1, 2 of the guide 100 are moved such that the end face 36 is the leading end of the strip 13, seen in the direction of travel of the bearing means 12, edges of the end face 36 will move along the surfaces of the track 9, 10, and could push any possible contamination forward, or at least out of the running path of the balls 8 on the track surfaces, preventing damage to the balls and/or track, and preventing obstacles that would prevent the balls from rotating freely. The edge portions 39 can further enhance smooth running of the guide. The edge portions 39 moreover can prevent grease to be pushed away from said running path.

Figure 7A:
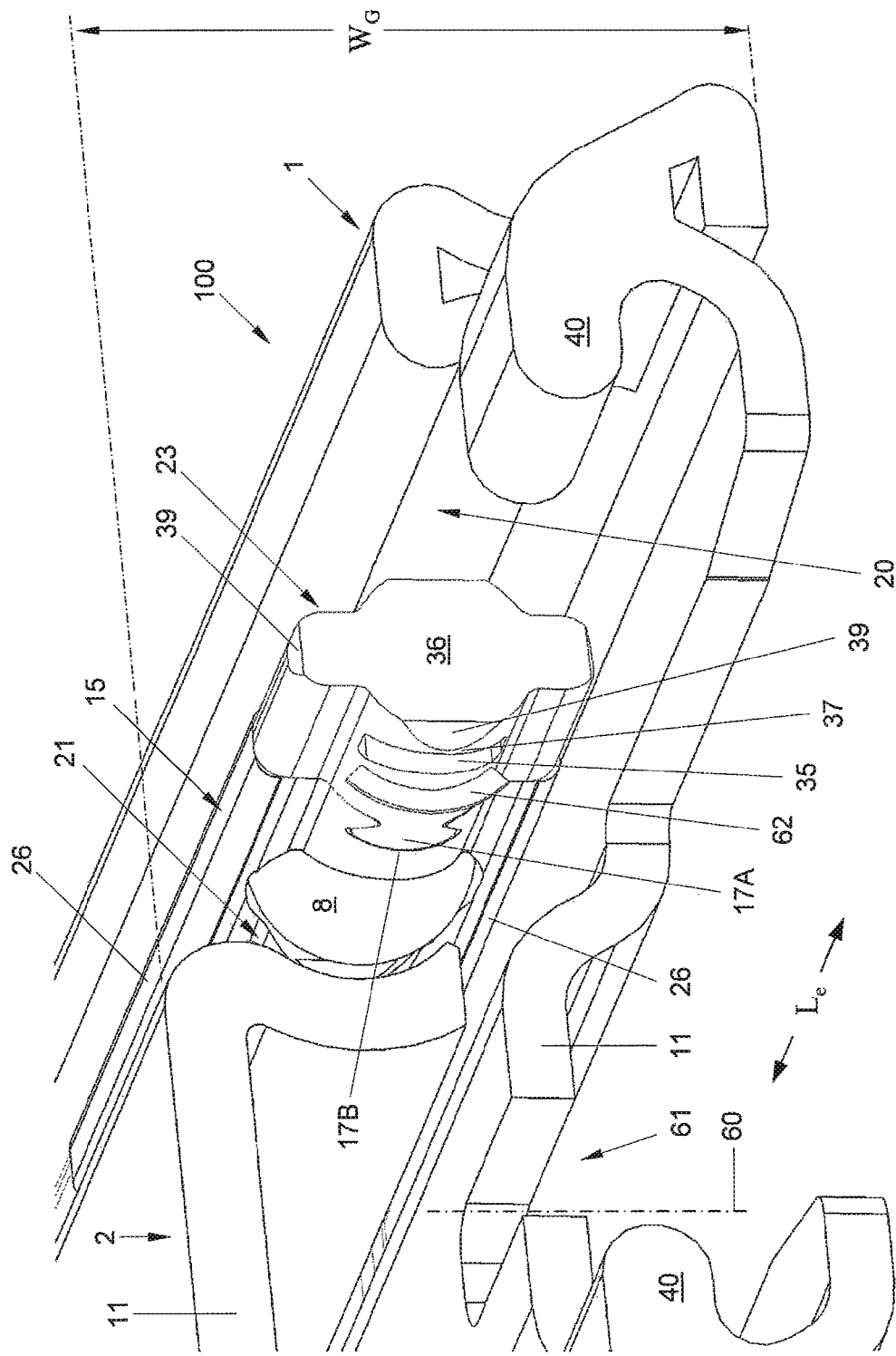

In embodiments the end module 23 can be provided with an element for cleaning the track, such as but not limited to a ring element extending around part of the end module 23, such as for example a felt ring 63, as is for example shown in FIG. 9A, which during use will be in contact with the track surfaces or parts thereof. Such ring or similar element 63 can also be used for greasing or oiling the track for example by at least partly saturating the element 63 with a lubricant such as oil or grease. In embodiments as for example shown in FIG. 7, the end module 23 or any other module 15, 14 can be provided with one or more extensions such as elements 66 which are provided alongside the surface parts of the track forming portions 20, 21, such that upon movement of the strip 13 along said trackparts, grease provided on said trackparts will be forced towards the part of the surface of the track on which the balls 8 run, improving greasing the contact area between the bearing balls 8 and the track 9, 10. These elements 66 can be combined with means for preventing contaminations to enter onto said contact area, such as for example but not limited to strips 45 as shown in FIG. 9. In FIG. 7A an end module 23 is shown with elements 62, preferably on opposite sides, which scrapes along the surface parts of the tracks on which the bearing elements 8 run, scraping off any contamination.

Alternatively or additionally the strip 45 as shown in FIG. 9 can be combined with the element 63 such as the felt ring 63 as shown in FIG. 9A and/or with the elements 62 as shown in FIG. 7A.

In the embodiments shown elements 62 can be formed by ridges extending along part of an outer surface of the end module 23. In other embodiments these elements can also be or alternatively be provided on other surfaces, such as of modules 15 and/or bridge elements 19.

Figure 8:
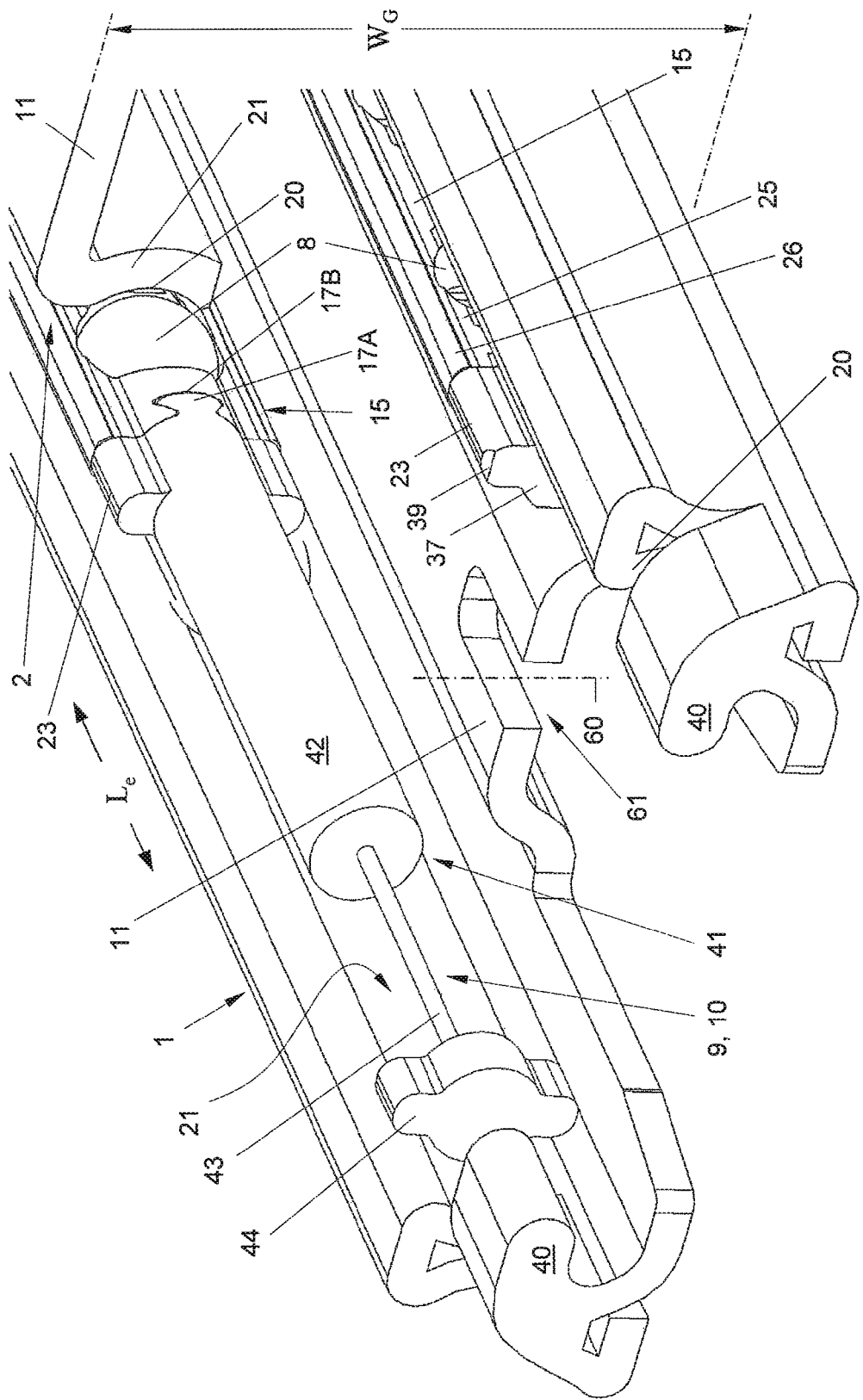
FIG. 8 shows schematically and partly broken away an alternative embodiment of a guide with stop means.

FIG. 8 shows an alternative embodiment of an end module 23, again provided with coupling means 17 for coupling thereof to a strip module 15 or bridge part 14, and a damper element 41. The damper element as such is known from the art, such as for example PowerStop® as manufactured by Zimmer, Germany, and can for example be a gas or fluid filled damper, having an cylinder 42 with a piston therein, and a stem 43 extending there from which is provided with a head 44 that can run against the stop element 40, damping the impact of the movement of the guide. As is known in the art a spring may be provided for resetting the damper. Similarly, retraction mechanisms, holding mechanisms and the like as known in the art of guides may be used with a system of the invention.

FIG. 9 shows schematically part of a guide 100, especially of a track 9, 10 thereof with a strip 13, seen from a longitudinal end, wherein an open side 64 is shown of the track, between the guide profiles 1, 2. In FIG. 9 the open side 64 faces upward. A closing strip 45 is provided on the strip 13, mounted in this embodiment on the ridge 26, for example clamped into a groove 49 along said ridge 26, which closes off the open side 64 above the strip 13, preventing contamination to enter between the strip 13 and the track forming portion 20, 21 through said open side 44. The closing strip 45 can for example be made of plastic or metal. The strip 45 shields the bearing 12 from the environment especially when combined with sealing means at the ends of the strip 13 such as for example the rings 63 which can be made of felt, plastic rubber or another suitable material. Such shielding prevents contamination of the bearing and the tracks. In FIG. 9 in broken lines groove 49 is indicated as a possible amendment for mounting the strip 45 or other elements.

FIG. 10 shows an embodiment of part of a bearing means 12 in an alternative embodiment. In this embodiment the strips 13 can be formed in a single piece or from modules 15 as discussed. The bridge part 14 can be provided with end parts 19 which can be inserted into slots in the strips 13 or modules 15 in stead of between strip modules 15, end modules 23 and/or further bridge part 14. In the embodiment shown a module 15 is provided with a slot 46 in a ridge 26, into which a substantially flat end part 19 of the bridge part 14 is inserted. Alternatively the end part 19 can be provided with a clamping means, such as for example shown in the closing strip 45, to be clamped onto the ridge 26. To this end the ridge 26 can be provided with said longitudinal groove 49 or a series of groove portions longitudinally spaced apart, such that the clamping means can engage such groove. By using longitudinally spaced apart groove portions, discrete positioning of the bridge part is possible, the bridge part being prevented from movement relative to the strip in longitudinal direction by separations between such groove portions. Alternatively, the end part 19 can be inserted into a slot 46A extending substantially parallel to the plane M, for example through ridge 26A, as indicated in FIG. 10 by broken lines. Moreover a bridge portion could otherwise be mounted to ball bearing strips, which may be formed from modules as described, which mounting can for example be achieved by welding, such as but not limited to ultrasonic welding, or by glue.

A kit of parts 101 according to the present invention can comprise different strip modules 15, end modules 23 and bridge parts 14, such that various different combinations can be made into bearing means 12, including two or more ball bearing strips 13 without a connecting bridge part 14.

As indicated before, the present disclosure allows for a virtually unlimited number of different bearings 12 with a limited number of different parts which can themselves be relatively inexpensive. By way of example, by providing a kit comprising modules with two and five balls, modules without balls, bridge portions and end portions, wherein at least two different ball sizes can be provided, a very large number of different types and sizes of guides could be provided with appropriate bearings, in an inexpensive way. By providing bridge portions having different sizes perpendicular to the strips 13, this can even further be enhanced. Moreover, a limited number of parts makes assembly less cumbersome and easier to automate.

A kit of parts of the present disclosure can provide for flexibility in for example length of a bearing, width of a bearing between guide strips, use of one or more bridge portions, position of such bridge portion or portions, mounting openings or other mounting means, locks or other features on the guide, positioning and type of stops, such as hard or soft, damping, retraction and release, selective provision of balls or such bearing elements, cleaning and greasing of the tracks, providing closure means for the bearing means, such as a closure strip and/or sealing means, continuous lubrication and easy repair or adaptation by replacement of one or more parts of a bearing.

The present invention is by no means limited to the specific embodiments described and disclosed in the drawings. Many amendments and variations are possible within the scope as defined by the claims, including each and all combinations and permutations of embodiments and parts thereof as disclosed. For example end modules 23 can be integrated with strip modules 15 or bridge parts 14, whereas the end modules can be provided with balls 8 too. Different strip modules can be added, for example free of openings 22 or balls 8, whereas one or more of the openings 22 can be free of a ball 8 and can for example be used for different purposes, such as mounting a sensor, cleaning element, brake element, locking element or the like. In the embodiments shown strip modules 15 having two and five openings cq balls have been shown. It shall be clear that modules can be provided with any number of openings and/or balls. Moreover, balls can be distributed along the strips 13 in a different manner, for example in an irregular pattern or at different spacing or for example in two or more rows above or next to each other. In an alternative embodiment some or all modules 15 can be provided with one or more rolls, wheels or sliders in stead of or next to the or each ball 8. Also a bearing means according to the present invention can have more than one bridge part 14. The coupling means can be designed differently, for example including but not limited top screw threads, clamping means, form or force closure means, ball and socket elements or the like key-lock systems for coupling modules in line.

These and various other amendments are possible and will be clear to the skilled person based on the disclosure as given and general knowledge.

The invention claimed is:

1. A slide guide, comprising:
   at least a first and a second guide profile, each guide profile having a longitudinal direction, where the second guide profile extends at least partly within the first guide profile, the longitudinal direction of the guide profiles being parallel to each other, wherein on two opposite sides of the second guide profile and between of the first and second guide profiles, parallel to the longitudinal directions, guide tracks are formed between wall parts of the first and second guide profiles; and
   a ball cage comprising:
   at least one module strip including at least one guide strip module disposed in each of the guide tracks, each guide strip module having a longitudinal direction and having opposing ends, the at least one guide strip module including coupling elements at each end so as to permit said at least one guide strip module to be connected end to end with another guide strip module having a cooperative coupling element, said at least one guide strip module including a series of spaced openings;
   ball bearings disposed in the openings which run on said wall parts forming the guide tracks; and
   a bridge part including opposed end parts having opposing ends and a mid-section extending between and coupling the end parts, each of the end parts including a coupling element at an end thereof, one coupling element of one of the at least one guide strip module of each module strip being coupled to the coupling element of each of the end parts of the bridge part such that the module strips are disposed in substantially parallel opposed relation in respective guide tracks and prevented from movement relative to each other, at least in the longitudinal direction of the module strips.

2. The slide guide according to claim 1, wherein the mid-section of the bridge part extends substantially perpendicular to the longitudinal direction of the first and second guide profiles.

3. The slide guide according to claim 1, wherein each end part includes a coupling element at each end thereof configured to permit coupling of the respective end part coupling element to a cooperative coupling element of a guide strip module and, wherein each module strip includes two guide strip modules coupled end to end, wherein a coupling element on one end of one of the guide strip module of each module strip is coupled to one end of each end part of the bridge part to retain the module strips in opposed parallel relation and permit another module having a module coupling element to be coupled to the coupling element on the other end of each end part.

4. The slide guide according to claim 1, wherein one of the coupling elements of the at least one guide strip module of each module strip is releasably coupled to the coupling element of one of the end parts of the bridge part.

5. The slide guide according to claim 1, wherein the each at least one guide strip module coupled to an end of an end part includes a most distal guide strip module having a most distal guide strip module end, the slide guide further including a stop module having a coupling element coupled to the coupling element of the most distal guide strip module ends for engaging a cooperative stop element in the respective guide track for limiting the relative movement of the first and second guide profiles in said longitudinal direction.

6. The slide guide according to claim 1, wherein the at least one guide strip module of each module strip is made of plastic.

7. The slide guide according to claim 3, wherein the another module is coupled to the other end of each end part and the another module is either another guide strip module or a stop module cooperative with a stop element in the respective guide track to limit relative travel of the guide profiles with respect to one another.

8. The slide guide according to claim 1, wherein the end parts of the bridge part each have first and second ends including coupling elements at each end thereof, the slide guide further including module strips including at least two series connected guide strip modules coupled to the first end of each end part via respective coupling elements and module strips including at least one guide strip module coupled to the second end of each end part via respective coupling elements.

9. The slide guide according to claim 1, wherein at least one of the guide strip modules and/or the bridge part are made at least partly from plastic, and at least one of the guide strip modules coupled to each end part includes a retaining means for retaining the ball bearings in the respective openings such that opposing peripheries of each ball bearing extend from said at least one of the guide strip modules and abut the walls defining the respective guide track.

10. The slide guide according to claim 1, further including a closing strip coupled to and extending along at least part of the at least one guide strip module, the closing strip closing off, at least partly, a guide track in which the guide strip module extends.

11. The slide guide according to claim 1, wherein:
   each module strip includes one guide strip module having a most distal end from the end part to which the respective module strip is coupled; and
   the slide guide further includes stop modules having respective coupling element at an end of each stop module, the coupling element of each stop module being coupled to the coupling element of the most distal end of the guide strip module having the most distal end from the respective end part,
   the stop modules configured for engaging stop elements in the respective guide tracks for limiting the relative movement of the first and second guide profiles in said longitudinal direction; and
   a closing strip coupled to and extending along at least part of one of the at least one guide strip module in each module strip, the closing strip closing off, at least partly, a guide track in which the respective module strip is disposed.

12. The slide guide of claim 1 wherein the coupling elements on opposing ends of the at least one guide strip module within each module strip are like coupling elements.

13. A modular ball cage for a slide guide comprising:
   a bridge part including opposed spaced generally parallel end parts having first and second ends in a longitudinal direction, wherein an end of each end part includes a coupling element, the end parts coupled by a mid-section extending between the first and second end parts;
   a pair of opposed parallel module strips, each module strip including at least one guide strip module having opposing ends including coupling elements, the at least one guide strip module including a plurality of spaced openings having a ball bearing disposed therein, the coupling elements of the guide strip modules being configured to permit the guide strip modules to be coupled end to end, the coupling element of each end part of the bridge part being coupled to one of the coupling elements of the at least one guide strip module of each module strip to retain the module strips in opposed spaced parallel relation.

14. A kit of parts for use in forming a bearing cage for a slide guide comprising:
a plurality of guide strip modules having a longitudinal direction and opposing ends in the longitudinal direction, each end including a coupling element, wherein the coupling elements are configured to allow a coupling element of each guide strip module of the plurality of guide strip modules to be releasably connected to another coupling element of another one of the plurality of guide strip modules, wherein the plurality of guide strip modules each include a plurality of openings spaced in the longitudinal direction and a ball bearing disposed in at least some of the openings.

15. The kit of parts according to claim 14, wherein the kit further comprises a bridge part having at least two parallel, opposed and spaced end parts which each extend in a longitudinal direction, and a mid-section extending between and interconnecting the spaced end parts, wherein the end parts have opposing ends seen in the longitudinal direction with coupling elements configured for coupling each end of the end parts to coupling elements of one of said plurality of guide strip modules, such that two series of opposed, generally parallel guide strip modules can be formed coupled in a spaced apart, substantially parallel relation by said bridge part.

16. The kit of parts according to claim 15, wherein the kit further comprises an end module having an end including a coupling element configured for coupling the respective end module with a cooperative coupling element of either one of the plurality of guide strip modules or one of the end parts of the bridge part.

17. The kit of parts according to claim 16, wherein the guide strip modules each have opposite longitudinal ends, wherein said longitudinal ends are provided with said coupling elements which are configured for coupling the respective guide strip modules in said longitudinal direction to each of another guide strip module, the bridge part or the end module.

18. The kit of parts according to claim 17, wherein the plurality of guide strip modules, the end parts of the bridge part and the end modules include compatible coupling elements for forming couplings between each of:
the plurality of guide strip modules and another one of the plurality of guide strip modules;
the plurality of guide strip modules and the end parts bridge part; and
the end module and either the bridge part or any one of the plurality of guide strip modules.

19. The kit of parts according to claim 14, wherein the coupling elements of the guide strip modules are designed for coupling the guide strip modules in a direction including an angle with the longitudinal direction of the guide strip modules, wherein 0°≤said angle≤180°.

20. The kit of parts according to claim 14, wherein the guide strip modules are molded plastic.

21. The kit of parts according to claim 14, wherein at least some of the plurality of guide strip modules include retaining members configured to retain the ball bearings in respective openings.

22. The kit of parts according to claim 14, further comprising a closing strip configured for coupling to at least one of the guide strip modules, and the closing strip, upon coupling to the at least one guide strip module configured for closing off, at least partly, a guide track upon disposition of the at least one guide strip module and the closing strip in the guide track.

23. The kit of parts according to claim 15, wherein the kit further comprises at least two end modules, each including a coupling element configured for coupling either to a cooperative coupling element of an end of one of the plurality of guide strip modules or one end of an end part of the bridge part.

24. The kit of parts according to claim 23, wherein:
the coupling elements of the plurality of guides strip modules, the end parts and the end modules are configured for coupling via respective coupling elements, any one to any other one, in a direction including an angle with respect to the longitudinal direction of the respective guide strip module, end part or end module, as applicable, wherein 45°≤said angle≤135°;
the guide strip modules, the bridge part and the end modules are molded plastic; and
the kit further comprises a closing strip configured for coupling to and extending along at least part of one of the guide strip modules, for closing off, at least partly, a guide track of a slide guide when the respective guide strip module with a coupled closing strip is disposed therein.

25. The kit of parts according to claim 15, wherein:
the coupling elements of the guide strip modules, and the end parts are configured for coupling, any one to any other one, in a direction including an angle with the longitudinal direction of the respective modules or end part, as applicable, wherein 0°≤said angle≤180°;
the guide strip modules and the bridge part are molded plastic; and
the kit of parts further comprising a closing strip configured for coupling to and extending along at least part of one of the guide strip modules, for closing off, at least partly, a guide track of a slide guide when the respective guide strip module is disposed therein.

26. The kit of parts according to claim 18, wherein:
the coupling elements of the guide strip modules, the end parts and the end modules are configured for coupling, any one to any other one, in a direction including an angle with respect to the longitudinal direction of the respective modules or end part, as applicable, wherein 0°≤said angle≤180°;
the guide strip modules are molded plastic; and
the kit further comprising a closing strip configured for coupling to and extending along at least part of a guide strip, for closing off, at least partly, a guide track of a slide guide when the respective guide strip module is disposed therein.

27. A bearing cage for a slide guide comprising:
at least two module strips and a bridge portion, the bridge portion coupling the module strips in a spaced apart, parallel relationship, wherein each module strip includes at least one guide strip module having coupling elements at opposing ends thereof and the bridge portion includes parallel spaced end parts interconnected by a mid-section, the at least one guide strip module in each module strip including a plurality of spaced openings and a ball bearing disposed in each of the plurality of the openings, each guide strip module being coupleable end to end in a longitudinal direction to another guide strip module via the coupling elements at respective ends thereof, wherein a coupling element of one of the at least one guide strip module within each module strip is releasably coupled to a cooperative coupling element on one end of each end part of the bridge part to secure the module strips in the spaced apart parallel relationship.

28. The bearing cage according to claim 27, wherein each of the module strips includes at least two guide strip modules coupled end to end via respective coupling elements.

29. The bearing cage according to claim 27, wherein the at least one guide strip module includes opposing sides and the ball bearings disposed in the openings are sized so as to extend outward of the sides of the respective guide strip module so as to permit the ball bearings to run in a cooperative track when the respective guide strip module is disposed therein.

30. A method for forming a ball bearing cage for a slide guide comprising:

providing a pair of module strips, each including at least one guide strip module having coupling elements at opposing ends;

disposing a plurality of ball bearings in a corresponding plurality of openings in at least one guide strip module within each module strip and retaining the plurality of ball bearings in the plurality of openings via retaining elements formed in each of the at least one guide strip module;

providing a bridge part having opposed end parts which each have opposing ends, the end parts coupled in spaced generally parallel relation by a mid-section, wherein at least one end of each end part includes a coupling element; and connecting respective coupling elements of one end of one of the at least one guide strip module within each module strip and one end of each end part to retain the pair of module strips in spaced, generally parallel relation.

31. The method according to claim 30, further comprising disposing the spaced modules strips of the ball bearing cage in spaced guide tracks formed between inner and outer surfaces of first and second guide profiles to permit slideable relative movement of the first and second guide profiles with respect to each other.

* * * * *